United States Patent [19]

Hard

[11] Patent Number: 4,602,820
[45] Date of Patent: Jul. 29, 1986

[54] RECOVERING METAL VALUES FROM GEOTHERMAL BRINE

[76] Inventor: Robert A. Hard, Box 195 A, RD#1, Spangsville Rd., Oley, Pa. 19549

[21] Appl. No.: 610,258

[22] Filed: May 14, 1984

Related U.S. Application Data

[63] Continuation-in-part of Ser. No. 490,175, Apr. 29, 1983, abandoned.

[51] Int. Cl.⁴ .................... C22B 11/04; C22B 13/04; C22B 15/12; C22B 25/04
[52] U.S. Cl. ........................................ 299/5; 166/267; 75/109; 299/7
[58] Field of Search ................... 166/244 C, 267, 310, 166/371; 299/4, 5, 7; 75/0.5 AA, 109; 60/641.2, 641.3, 641.5

[56] References Cited

U.S. PATENT DOCUMENTS

| | | | |
|---|---|---|---|
| 2,070,134 | 2/1937 | Keyes | 75/109 |
| 2,473,962 | 6/1949 | McCutcheon | 75/109 |
| 2,905,323 | 9/1959 | Megesi | 75/109 X |
| 3,154,411 | 10/1964 | Back et al. | 75/109 |
| 3,288,598 | 11/1966 | Hogue | 75/109 |
| 3,574,599 | 4/1971 | Ortloff et al. | 299/5 X |
| 3,697,567 | 10/1972 | Taylor, Jr. | 75/109 |
| 3,891,394 | 6/1975 | Smith et al. | 166/244 CX |
| 3,985,554 | 10/1976 | McCoy | 75/109 |
| 4,127,989 | 12/1978 | Mickelson | 75/108 X |
| 4,191,557 | 3/1980 | Kondis | 75/0.5 AA X |
| 4,370,858 | 2/1983 | Awerbuch et al. | 60/641.2 X |

Primary Examiner—George A. Suchfield
Attorney, Agent, or Firm—F. Eugene Logan

[57] ABSTRACT

A process is provided for recovering valuable metals from geothermal brine comprising introducing donor metallic particles into a geothermal zone which is dominated with hot-pressurized geothermal brine which contains a metal value selected from the group consisting of gold value, silver value, copper value, lead value, tin value and mixtures thereof. The donor metallic particle contains a donor metal selected from the group consisting of iron, zinc, aluminum and mixtures thereof. The process further comprises forming a deposit on the donor metallic particles by replacing at least a part of the donor particle with the metal values, producing a stream of the hot-pressurized geothermal brine containing the donor metallic particles which, in turn, contain the deposit of metal values, and separating the donor metallic particles from the thusly produced stream of hot-pressurized geothermal brine.

12 Claims, 1 Drawing Figure

RECOVERING METAL VALUES FROM GEOTHERMAL BRINE

CROSS-REFERENCE TO RELATED APPLICATION

This is a continuation-in-part application of Ser. No. 490,175 filed Apr. 29, 1983 entitled Recovery of Heavy Metals from Geothermal Brines now abandoned.

BACKGROUND

1. Field of the Invention

This invention pertains to the recovery of geothermal brine from liquid dominated subterranean zones and to the recovery of valuable metallic values present in the brine.

2. Description of the Prior Art

It has been recognized for many decades that the geothermal brines of the California Imperial Valley have the potential for recovery of valuable minerals such as copper, zinc, lead and silver in addition to such minerals of lower value such as potassium or lithium. However, with the advent of higher prices of energy in the 1970-80 period, attempts to recover these elements have been superseded by the incentives to produce electrical power from the thermal resources in the brine. Most of the development during this period has gone into solving the problem of handling the immense amount of silica and silicate scale which is produced as these brines are converted to steam. These silica and silicate scales, which are deposited along the pipes and fittings as well as in the flash vessels, consist of about 98% silica and iron silicates and 2% metallic sulfides. Some of the metallic sulfides tend to deposit near the well bore, but most of these sulfides intermix with silicates and form a scale mixture which is difficult to handle. It is very difficult to recover the diluted metallic values from such scale mixtures. Since some pure or undiluted sulfide scale contains about 10% by weight combined lead, copper and zinc and 0.3% by weight silver, it is highly desirable to collect the sulfide scale undiluted and substantially free of the silica and silicate scale.

Some samples of unflashed geothermal brine have shown a silver content from about 0.5 to about 2 parts per million (ppm). For such brines, a 55 megawatt (MW) plant would require about 120 million pounds of brine per day, and the equivalent silver production would be 120 pounds or 1440 troy ounces per day. If all of the silver were recovered from a geothermal brine which contains one ppm of silver, then at $10 per ounce, the revenue from the recovered silver would be 10.9 mills/kwh.

It is estimated that the plant in the above example would produce 50 to 100 tons of scale per day on a dry basis. Under present practice, only a small fraction of the silver is deposited in the scale and much is simply reinjected. That which comes down in the silica/silicate scale is very diluted and is extremely difficult to recover economically, not just because of being low in grade, but because the total tonnage of scale produced is quite low by normal production standards in the mineral industry. Thus, it can be appreciated that it would be very desirable to separate the valuable minerals in some form apart from the much larger volume of silica/silicate scale to obtain richer concentrates which could then be processed for ultimate conversion to pure metals.

As mentioned before, a part of the lead, copper, zinc and silver in the brine tends to separate as a sulfide scale. However, since there is insufficient natural sulfide in the brines to precipitate all of the heavy metals, some have suggested adding additional sulfide to the geothermal brine before flashing to produce additional sulfide scale.

U.S. Pat. No. 4,127,989 describes a process for maintaining the geothermal brine at a pressure above the bubble point, adding sodium sulfide to form additional sulfide precipitate and filtering out the heavy metal sulfides under pressure. Manganese, iron, copper, silver, lead and zinc are said to be recovered in this manner. The major disadvantages of this process are the codeposition of silica due to the alkalinity of sodium sulfide, the formation of hard-to-filter sulfide slimes, and the large volume of the surface tanks required to permit settling of the sulfide precipitates before filtering. The tanks in such a process have to be under a pressure of about 700 psia in order to maintain the brine above its bubble point. Such pressure duty would make the tanks and the process quite costly. These practical difficulties probably are the reasons why such a process has not been further developed or commercialized.

As an alternative, injection of sulfide to the bottom of the well would enable the wellbore to be used as the reaction vessel; and then, only the settling and filtering units would have to be supplied at the surface. However, this would still require quite a large pressurized holding volume to permit settling of the finely divided sulfides.

Another approach to recovery of heavy metals by sulfiding was reported in a publication entitled "Recovery of Heavy Metals from High Salinity Geothermal Brine" prepared for the U.S. Bureau of Mines by Standard Research International. This method involved treatment of spent amounts to recover zinc, lead, copper and silver. In order to recover all of the zinc, it was necessary to sulfidize some of the iron and manganese. Unfortunately, this makes the process uneconomical, because the iron and manganese have less economic value than the sulfiding agent. Furthermore, by treating only the spent brine, there is no possibility of recovery of the more valuable elements such as silver or possibly gold which will be lost in the silica/silicate scale during the subsequent flashing process.

U.S. Pat. No. 4,016,075 discloses a process for removing all of the metals including iron and manganese along with silica from geothermal brine by using ammonium hydroxide to raise the pH and form oxides and hydroxides. Ammonia is subsequently recovered by lime addition. Unfortunately, this process for treating geothermal brines generates huge volumes of sludge and make, the less abundant, but more valuable metals very difficult to recover economically. As in the other prior art methods, economic drawbacks are the reason why this process has not been commercialized.

Accordingly, there is a need for a simple and economical method for recovering the valuable metals such as gold, silver, copper, lead and tin from geothermal brines, and by so doing, offset the cost of producing electrical power therefrom. The present invention provides a long sought solution to this problem, and in so doing, decreases the corrosion rate of the metal casing, reduces the formation of scale in the well bore, and facilitates the conversion of hot-pressurized brine to steam.

SUMMARY OF THE INVENTION

Mineralized geothermal brines such as are found in the Imperial Valley of California, usually contain significant amounts of zinc, lead, copper, gold and silver as well as iron and manganese. Geothermal brines are principally solutions of sodium and potassium chlorides along with lessor amounts of lithium, boron, calcium and magnesium. Typical brines have temperatures of 400°–650° F. and total dissolved solids of 25,000 to 250,000 ppm. In addition to these salts, the brines contain 300 to 700 ppm of dissolved silica and large amounts of dissolved gases such as carbon dioxide, methane ammonia and hydrogen sulfide.

When constructing a system for recovery of geothermal power, holes are drilled to a depth of 3000–14000 feet and cased with steel pipe close to the producing zones. Usually, a slotted steel liner is emplaced through the fluid-producing zones. This casing and slotted liner is exposed to the brines which have a pH of 3.5 to 4.7. The corrosiveness of this environment is greatly enhanced by the presence of the heavy metals in the brine.

When these hot brines are produced from deep wells, a sulfide scale containing lead, copper, silver and some gold is deposited on the inside of the well bore. This scale also deposits, along with the silica/silicate scale which precipitates as the brines are flashed to make steam. Since the silica/silicate scale is in relatively large amounts, it dilutes the valuable minerals of the relatively small amount of sulfide scale, thereby making it extremely difficult to recover copper, lead and silver values economically. Some geothermal brines also contain tin which also forms a sulfide scale.

In accordance with the practice of the present invention, there is provided a process to separately recover the metallic values from geothermal brine apart from the silica/silicate scale and to facilitate removal of valuable metal values from the system. In one embodiment of this invention, an increased amount of valuable metals is recovered from the brine than can be recovered from a mixture of silica/silicate scale and sulfide scale.

One embodiment of this invention comprises pumping a slurry of iron powder in water or clean brine to the bottom of a liquid dominated producing geothermal well. The iron powder slurry is introduced through a small diameter tubing string and continuously mixed with the brine as it flows from the formation. The iron powder reacts with the dissolved lead, copper, gold, silver and tin values in the natural brine as it flows into the well, causing some of the iron powder to go into solution. Those metals which are below iron in the electromotive series will be deposited onto the surface of the iron particles and carried to the surface of the flow of hot brine. The resulting composite of valuable metals and iron particles is separated from the brine by a magnetic or gravity separation. In one embodiment, a hydrocyclone is used to make the separation. Recovery of the pure valuable metals can then be accomplished by conventional methods from the metallic particles.

Gold, silver, copper, lead and tin lie below iron, zinc and aluminum in the electromotive series. That is, the donor metal, i.e. iron, zinc or aluminum, will displace the valuable metals from solution. By injecting donor metal particles, such as iron powder into geothermal brine, the valuable metals if present in the brine will be deposited as a coating on the residual donor iron particles.

In one embodiment of this invention, a slurry of iron powder in clean brine is continuously injected through a small tubing string into the bottom of a well. The donor iron powder reacts with any of the copper, lead, silver, gold and tin in the brine and is carried to the surface with the produced fluid. While flowing up the well bore, some of these valuable metals can be sulfidized by contact with the $H_2S$ in the brine. It is also possible in some wells that some of the zinc would react with $H_2S$ and the corresponding zinc sulfide would nucleate on the surface of the iron powder.

In general, the amount of iron injected into the wellbore is in excess of that stoichiometrically needed to precipitate all of the lead, copper, silver gold and tin from the brine. This permits the residual part of the donor iron particles to be readily collected at the surface or wellhead using magnetic separation or a gravity separation technique. A nonlimiting example of a gravity separator is a hydrocyclone.

Another very important advantage of this invention is that corrosion of the steel casing in the wellbore is reduced because the iron powder is, in effect, acting sacrifically by replacing the valuable metal ions in brine which would otherwise be available to attack the steel casing. It is well known that the Imperial Valley brines are especially corrosive to mild steel. Tests have shown pitting rates in Salton Sea brine on 1020 and 4130 steel to be in the range of 2700 to 5400 micrometers per year. The presence of lead, copper and silver contributed substantially to this high rate of corrosion. Normally, deareated salt brines which do not contain such metal ions are not very corrosive to mild steel.

Since the steel casing is reacting with some of the metal ions in the brine, it follows that some of the valuable constitutents are being removed in the form of corrosion products. This can explain the variations reported in the gold and silver content of a particular brine over periods of time.

Another important advantage in this invention is that the sulfide scale which normally builds up over a period of weeks to months in the top of the wellbore, is greatly reduced or eliminated. This scale, which is primarily sulfides mixed with some silicates, eventually reduces brine production sufficiently to require shutdown and descaling to the wellbore. Frequently, such scale is very hard and must be removed by a reaming operation. By reducing the frequency of or eliminating wellbore descaling, considerable cost savings are realized. Furthermore, shutting down geothermal wells for a long period can cause serious problems due to damage to the brine flow paths in the subterranean geothermal production zone.

In general, the amount of donor or iron particles injected into the well should be in excess stoichiometrically of that required to react with all of the valuable metals in the brine, so that some residual donor metal or iron remains which can act as a carrier for the deposited valuable metals and to subsequently facilitate the separation of the valuable metals from the produced brine by providing a good response to both gravitational and magnetic separation techniques.

In one embodiment of this invention, the residual donor metal particles are separated from the brine stream before the brine is flashed. Iron powder which has a specific gravity of from about 7 to about 8, is easily removed from the bulk of the stream by a centrifugal separation such as a hydrocyclone. This embodiment produces a small stream containing most of the residual metal particles which are then sent to a selectively small flash crystallizer where, upon flashing, the metal values are diluted with a relatively very small amount of silica/silicate scale. In a further embodiment of this invention, the separated residual donor metal particles are treated in magnetic separators at atmospheric conditions to further concentrate the valuable metal values such as gold, silver, copper, lead and tin.

In an alternate embodiment of this invention, the separation of the residual iron particles from the brine is effected while still under wellhead pressure by treating the slurry as it emerges from the wellhead in a magnetic filter. The magnetic filter can consist of a nonmagnetic vessel such as a titanium cylindrical vessel containing steel balls. Electromagnets on the outside of the titanium vessel create a magnetic field around and through the steel balls which in turn act as collectors for the residual iron powder or particles, which contain contain deposited thereon, the valuable metallic values. After collection of sufficient residual iron powder, the pressure drop through the steel balls will increase to a predetermined value at which point the produced brine stream is diverted to another similar magnetic filter and the first filter is demagnetized and cleaned, and the metallic values separated from the residual iron particles.

In a third embodiment of this invention, the residual donor metal particles or powder while entrained in the brine stream are first flashed in a crystallizer and then collected along with the precipitated silica/silicate scale. The mixture of silica/silicate scale and residual donor metal particles are then treated by conventional magnetic separation to form a concentrated residual metal particle stream for subsequent refining into valuable metal values. This method of separation would work best in those embodiments where the silica/silicate scale tends to seed on the residual donor metal particles and coat the residual donor metal particles in such a way as to make donor metal particles physically inseparable from the silicates. This method is the simplest method but probably not the best method for many brines.

In most of the embodiments described above, the donor metal particles can be iron, zinc or aluminum. Mixtures of such particles can also be used. Magnetic separation techniques are, of course, only applicable to those embodiments using iron as the donor metal particles.

Accordingly, there is provided by this invention a process for recovering a metal values from geothermal brine comprising introducing donor metallic particles into a geothermal zone which is dominated with hot-pressurized geothermal brine which contains a metal value selected from the group consisting of gold value, silver value, copper value, lead value, tin value and mixtures thereof. The donor metallic particles contain an effective amount of a donor metal consisting of iron, zinc, aluminum and mixtures thereof. The process further comprises forming a deposit on the donor metallic particles by replacing at least a part thereof with the metal value of the geothermal brine; producing a stream of the hot-pressurized geothermal brine containing the donor metallic particles with the deposit thereon; and separating the donor metallic particles with the deposit thereon from the produced stream of hot-pressurized geothermal brine.

In another embodiment, the separating of the donor metallic particles with the deposit thereon from the produced stream comprises centrifugal separation. In one embodiment, the donor metallic particles are iron particles. In a further embodiment, the separating of the donor iron containing particles with the deposit thereon from the produced geothermal stream comprises magnetic separation. In a further embodiment, the metal value is separated from the separated donor metallic particles.

There is also provided by this invention a process for recovering a metallic value from geothermal brine comprising introducing donor metallic particles through a wellbore into a geothermal zone which is dominated by hot-pressurized geothermal brine which contains a metal value selected from the group consisting of gold value, silver value, copper value, lead value, tin value and mixtures thereof. The donor metallic particles contain an effective amount of a donor metal selected from the group consisting of iron, zinc, aluminum and mixtures thereof. The process further comprises controlling the particle size and feed rate of the donor metallic particles introduced into the geothermal zone so that from about 5 to about 80% of the weight of the donor metallic particles, before their introduction into the wellbore, react with the hot-pressurized brine and is replaced by the metal value thereof, thereby forming residual metallic particles which comprise the metallic value attached to a remaining part of the donor metallic particles.

The process further comprises producing a stream of the hot-pressurized geothermal brine containing the residual metallic particles through the wellbore, and separating the residual metallic particles from the produced stream of hot-pressurized geothermal brine.

In a further embodiment, the metal value is separated from the separated residual metallic particles.

In one embodiment, the separating of the residual metallic particles from the produced stream of hot-pressurized geothermal brine comprises centrifugal separation.

In one embodiment, the donor metallic particles are iron-containing particles, and in a further embodiment the separating of the residual iron-containing particles from the produced geothermal stream comprises magnetic separation.

As discussed the donor metallic particles always comprises a metal selected from the group consisting of iron, zinc, aluminum and mixtures thereof. In a further embodiment the donor metallic particles are alloys. In a still further embodiment the alloy additionally comprises a second donor metal selected from the group consisting of calcium, silicon and mixtures thereof. Usually the calcium or silicon is alloyed with the iron, zinc or aluminum. Thus it can be seen that scrap metal alloys can be used to produce the donor metallic particles.

Accordingly, it is to be understood that "donor metal" as used herein is meant to include not only pure metals, or relatively pure metals, but alloys of such metals including alloys which also comprise calcium, silicon and other metals. Calcium and silicon can also act as donor metals for replacing the more valuable metals such as gold, silver, copper, lead and tin.

In another embodiment the donor metallic particles contain a major amount by weight of the donor metal. In general, a major amount of the donor metal is about 15% by weight or more of the total weight of the donor metallic particles.

DESCRIPTION OF THE PREFERRED EMBODIMENT

Figure 1:
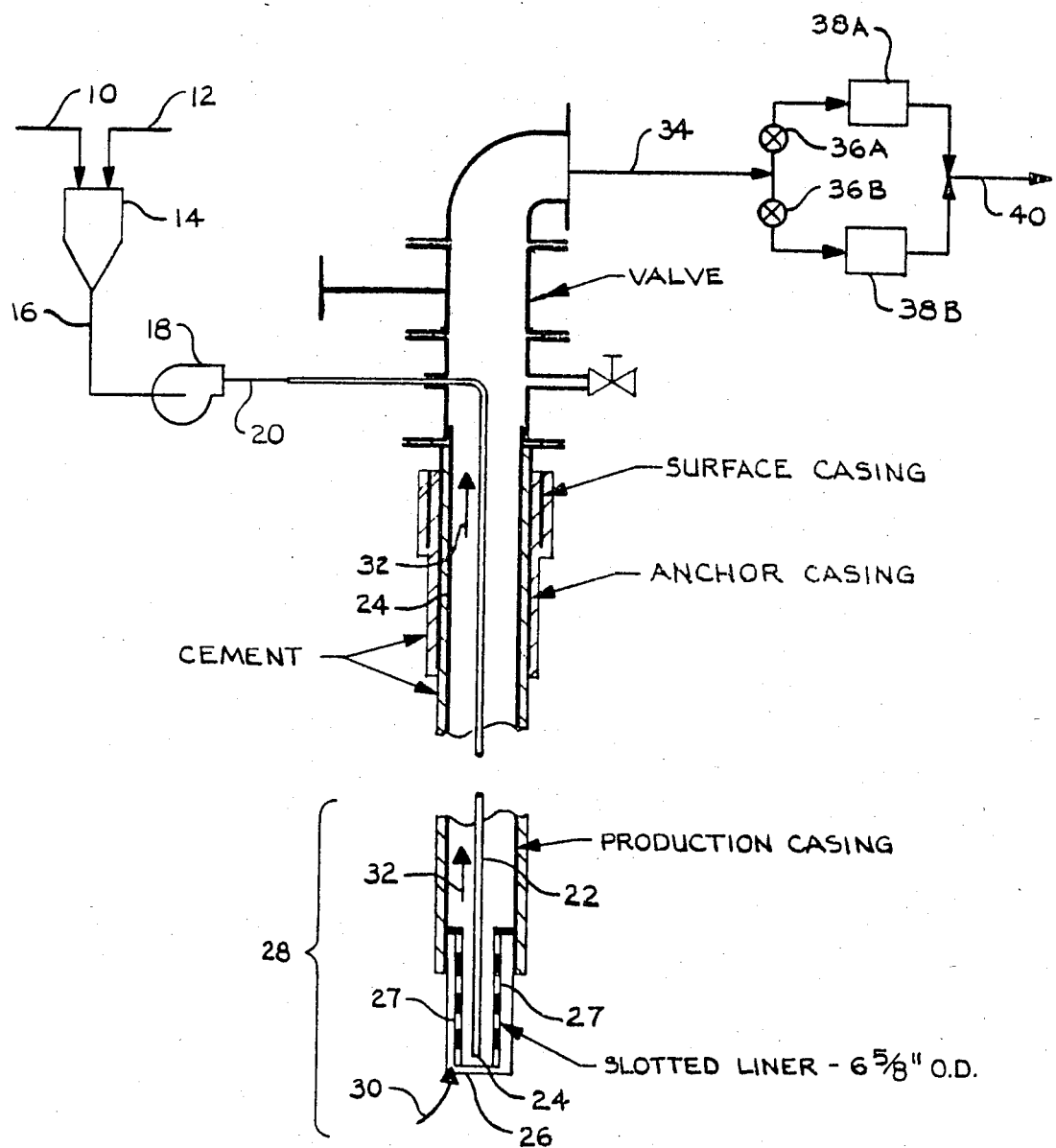
FIG. 1 shows a schematic diagram of the process where the residual metal particles are separated from the brine before the brine is flashed to crystallize the silica precipitate.

Referring to the Figure, which is not drawn to scale, an iron particle or powder in stream 10 and water or clean brine in stream 12 is introduced into mixing zone 14 wherein they are continuously agitated. The resulting iron particle slurry is pumped through conduit 16 by pump 18 through conduit 20 into 1 inch outside diameter tubing string 22 which enters wellhead 24.

The iron particle slurry is discharged from the bottom of tubing string 22 at outlet 24 whereupon the slurry mixes and reacts with hot-pressurized geothermal brine which flows into well bottom 26 through openings 27 from liquid dominated subterranean zone 28 in the direction of arrow 30.

The mixture of hot-pressurized geothermal brine and entrained iron particles flow to the surface inside the wellbore in the direction of arrow 32. The iron particles begin to react with the valuable metals, such as gold, silver, copper, lead and tin, and compounds thereof, contained in the hot-pressurized geothermal brine as soon as the iron particles come into contact with the brine. The valuable metals in the brine deposits on the surface of the iron particles. Such deposited valuable metals are offset by removal of an equivalent molar amount of iron from the iron particles.

Preferably, the particle size and flow rate of iron particles pumped into the geothermal liquid dominated zone is about twice the stoichiometric amount required to deposit all of the valuable metals on the surface of the iron particles. Preferably, the initial particle size and flow rate is such that the residual donor particle composition will comprise, in addition to all of the valuable metals, from about 40 to 60% of the initial weight of the iron particles introduced into the well. Preferably, the initial donor particle is from about 60 to about 200 Mesh, and most preferably, between about 100 and 150 Mesh.

The hot-pressurized geothermal brine containing the entrained valuable metals-donor iron particle composition is removed from wellhead 24 by conduit 34 where it flows through open valve 36A into magnetic separator 38A. In separator 38A the metallic particles, which contain about 50% of the original mass of the feed donor iron particles pumped to the well in stream 20, are separated from the hot-pressurized brine which is then discharged from separator 38A into conduit 40 from whence it is flashed to steam.

As magnetic separator 38A becomes filled with metallic particles, valve 36A is closed and valve 36B opened and magnetic separation of the metallic particles continues in similar manner in magnetic separator 38B. Various additional valving required has not been shown. Separator 38A is then emptied and readied for the next cycle.

EXAMPLE

This example is based on a single geothermal well producing 500,000 lb of brine per hour and having 85 ppm of lead, 8 ppm of copper and 0.8 ppm of silver.

By controlling the particle size and the feed rate of iron particles into the well so that:
- 10 parts of the iron powder reacts with and is replaced by the valuable metals,
- 1 part of the iron powder is lost to hydrogen production by reaction with the hydrogen sulfide of the brine, and
- 11 parts of the iron does not react but forms the residual iron particles upon which the valuable metals are recovered, then based on an iron powder cost of 21 ¢/lb, each geothermal well will earn over $50.00 per hour. Additional details of this analysis are given in Table I.

It is understood that the foregoing disclosure and illustration in the Figure shall be considered as an illustration of the principals of the present invention and are not to be interpreted as restrictive of the invention beyond that set forth in the claims.

TABLE I

Profit Potential of Valuable Metal Recovery from Geothermal Brine
Typical Valuable Metal Content of a California Imperial Valley Geothermal Brine

| Metal | ppm | Fe equivalent (ppm) |
| --- | --- | --- |
| Pb | 84 | 23 |
| Cu | 8 | 3.5 |
| Ag | 0.8 | 0.2 |
|  |  | 26.7 |

| Iron Requirement | (ppm) |
| --- | --- |
| For reaction with valuable metals | 26.7 |
| 10% for hydrogen production | 2.7 |
| sub-total | 29.4 |
| 100% excess for residual iron particles | 29.4 |
|  | 58.8 |

Based on 60 ppm of iron powder, then for a 500,000 lb/hr brine production, the iron powder feed rate required is 30 lbs/hr.

| Value of Recovered Valuable Metals | | | |
| --- | --- | --- | --- |
| Metal | Price, $/lb. | lb/hr | $/hr |
| Pb | 0.25 | 42 | 10.50 |
| Cu | 0.78 | 4 | 3.12 |
| Ag | 120. | .4 | 48.00 |
|  |  |  | 61.62 |

Based on a cost of 21¢/lb for 150 mesh cost iron powder, the cost of the iron powder for this well is $6.30/hr. The difference between the value of the valuable metals and the cost of the iron powder is $55.32 per hour, or $438,134 per year based on a 330 day operating year.

What is claimed is:

1. A process for recovering a metal value from geothermal brine comprising:
    (a) introducing donor metallic particles through a wellbore into a geothermal zone which is dominated by hot-pressurized geothermal brine which contains a metal value selected from the group consisting of gold value, silver value, copper value, lead value, tin value and mixtures thereof, said donor metallic particles comprising an effective amount of a donor metal selected from the group consisting of iron, zinc, aluminum and mixtures thereof;
    (b) controlling the particle size and feed rate of said donor metallic particles introduced into said geothermal zone so that from about 5 to about 80% of the weight of said donor metallic particles before their introduction into said wellbore reacts with said hot-pressurized geothermal brine and is replaced by said metal value thereof, thereby forming residual metallic particles which comprise said metal value attached to a remaining part of said donor metallic particles;

(c) producing a stream of said hot-pressurized geothermal brine containing said residual metallic particles through said wellbore; and (d) separating said residual metallic particles from said produced stream of hot-pressurized geothermal brine.

2. The process of claim 1, further comprising separating said metal value from said separated residual metallic particles.

3. The process of claim 1, wherein said separating said residual metallic particles from said produced stream comprises centrifugal separation.

4. The process of claim 1, wherein said donor metallic particles are introduced into said geothermal zone at a pressure above the bubble point pressure of said hot-pressurized geothermal brine.

5. The process of claim 1, wherein said particle size and feed rate of said donor metallic particles introduced into said geothermal zone is controlled so that from about 40 to about 60% of the weight of said donor metallic particles before their introduction into said wellbore reacts with said hot-pressurized geothermal brine and is replaced by said metal value thereof.

6. The process of claim 1, wherein said donor metallic particles are introduced into said wellbore under a pressure of at least about 700 psia.

7. The process of claim 1, wherein said donor metallic particles also comprise a metal selected from the group consisting of calcium, silicon and mixtures thereof.

8. The process of claim 1, wherein said donor metallic particles comprise about 15% by weight or more of said donor metal.

9. A process for recovering a metal value from geothermal brine comprising:

(a) introducing donor iron-containing particles through a wellbore into a geothermal zone which is dominated by hot-pressurized geothermal brine which contains a metal value selected from the group consisting of gold value, silver value, copper value, lead value, tin value and mixtures thereof;

(b) controlling the particle size and feed rate of said donor iron-containing particles introduced into said geothermal zone so that from about 5 to about 80% of the weight of said donor iron-containing particles before their introduction into said wellbore reacts with said hot-pressurized geothermal brine and is replaced by said metal value thereof, thereby forming residual metallic particles which comprise said metal value attached to a remaining part of said iron-containing particles;

(c) producing a stream of said hot-pressurized geothermal brine containing said residual metallic particles through said wellbore; and (d) separating said residual metallic particles from said produced stream of hot-pressurized geothermal brine.

10. The process of claim 9, wherein said separating of said residual metallic particles from said produced stream comprises magnetic separation.

11. The process of claim 9, wherein said particle size and feed rate of said donor iron-containing particles introduced into said geothermal zone is controlled so that from about 40 to about 60% of the weight of said donor iron-containing particles before their introduction into said wellbore reacts with said hot-pressurized geothermal brine and is replaced by said metal value thereof.

12. The process of claim 9, wherein said donor iron-containing particles also comprise a metal selected from the group consisting of calcium, silicon and mixtures thereof.

* * * * *